Patented June 24, 1952

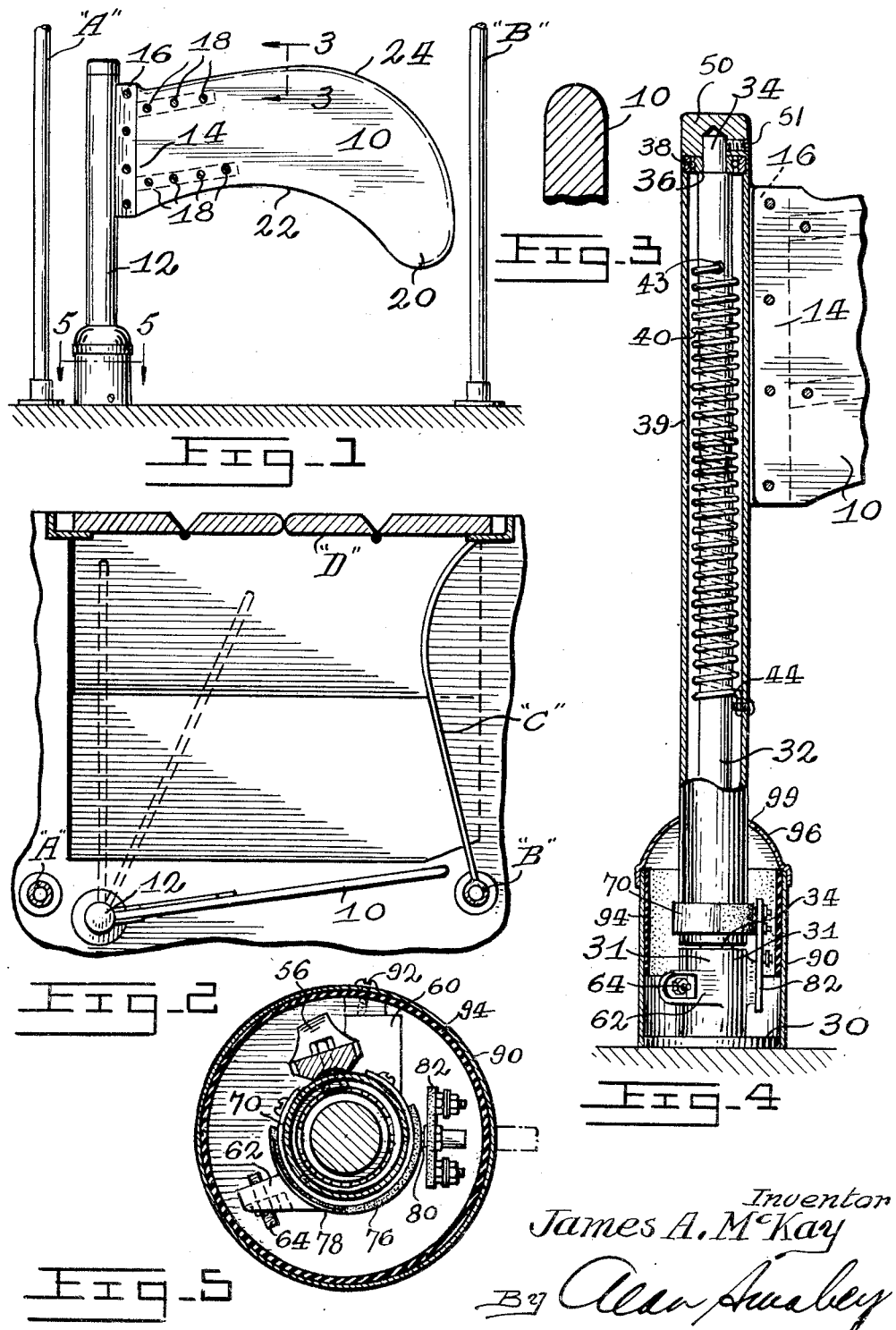

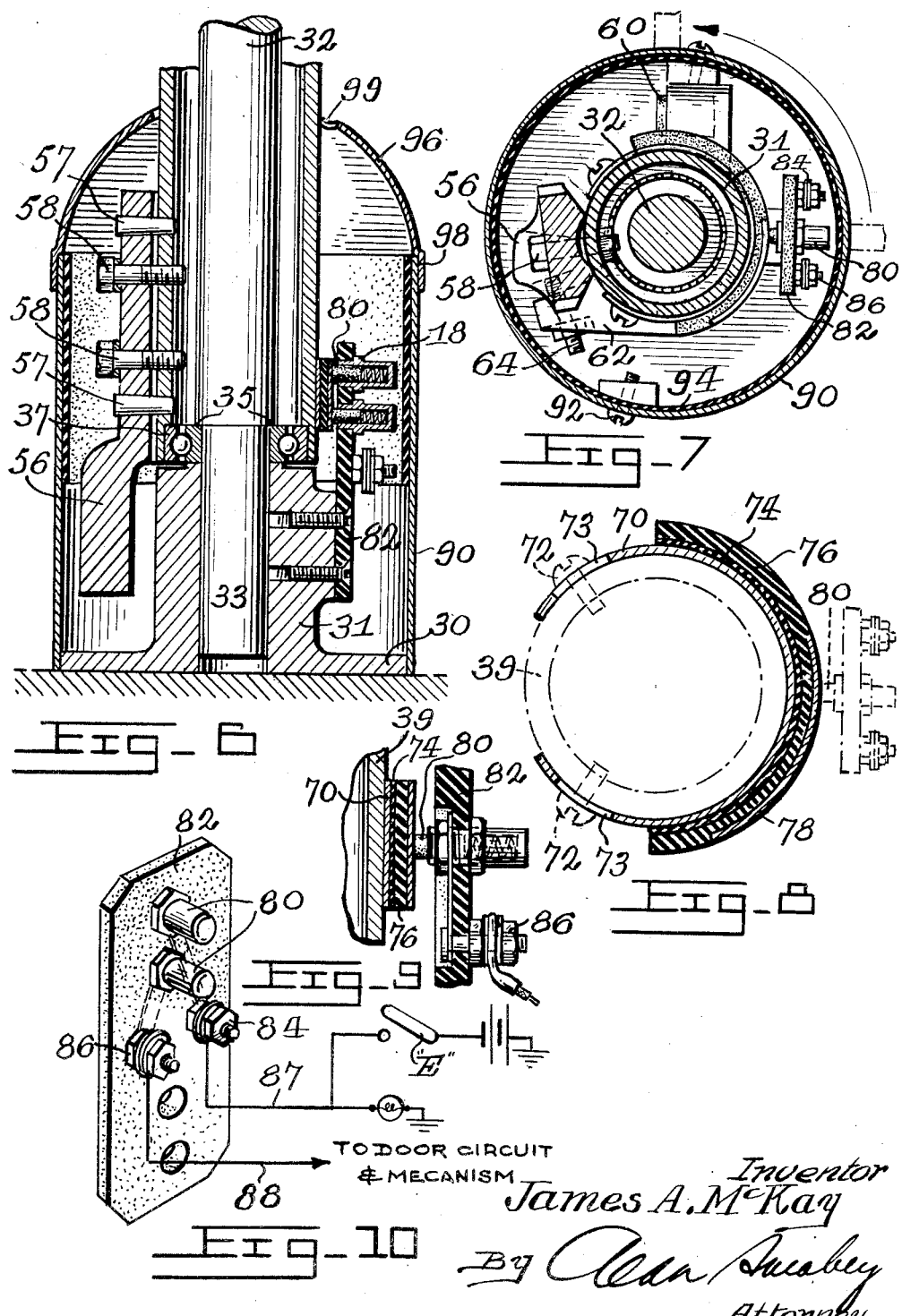

2,601,410

UNITED STATES PATENT OFFICE 2,601,410

CONTROL GATE

James A. McKay, Westmount, Quebec, Canada

Application November 3, 1950, Serial No. 193,909

1 Claim. (Cl. 268—33)

The present invention relates to apparatus for automatically operating doors and more specifically to a safety control gate for buses and tram cars that is adapted to automatically operate the exit doors of such vehicles.

Most prior art apparatus designed for this purpose consists of pneumatically operated treadles that are positioned in the floor of the exit passages of such vehicles so that the weight of the passenger operates the treadle and in turn the power operated doors.

There are certain disadvantages in apparatus of this nature in that under conditions of extreme cold they are sluggish and refuse to operate. Further, snow or sand often finds its way beneath the treadle plate and affects the efficient operation of the apparatus. Attempts have been made to overcome these difficulties by replacing the treadle plates by a pivotally mounted gate or barrier which extends partially across the exit passage so that the body contact of the passenger swivels the gate and actuates the power operated doors.

However, the apparatus of this nature at present available also presents certain disadvantages. For example, the barrier gates themselves are generally constructed almost entirely of metal making the swinging gate portion of considerable weight. This construction necessarily requires a fairly heavy spring for the gate return and so presents a potential hazard to any passenger standing behind the gate when it is released.

Further, the shape and disposition of these gates are such that they do not adequately bar the exit passage as required for complete safety. It is possible for a child to slip between the prior art gate and the exit door without actuating the door and when the gate is swung by a passenger leaving the vehicle, the child can be jammed between the gate and the door. The shape of the usual gate is such that if it is mounted so as to stop children from passing under the lower edge of the gate, the lower edge is consequently low enough to encounter the knees of a following passenger when the gate is released.

The supporting standards on which the gates are mounted for pivotal movement and the switch means between the supporting standard and the power operated doors also present certain disadvantages from the viewpoint of both the owners of such public vehicles and the public who use them in that they do not readily lend themselves to servicing nor do they operate efficiently under all climatic conditions.

*Applicant's development*

The present invention recognizes these problems and aims to provide a satisfactory solution for them by providing a safety control gate that is designed to give the public the necessary protection against possible accidents while at the same time provides a structure that will give the maximum of efficient operation as is required in a public vehicle.

Accordingly, the invention is a safety control gate adapted for use in a public vehicle having an exit passageway and power actuated doors forming a closure for said passageway.

More specifically, a control gate constructed in accordance with the invention is pivotally mounted so as to extend across the passageway in front of the exit door so that the body contact of a passenger leaving the vehicle swings the gate in a horizontal arc and by means of an electrical switch the power means operating the closure doors is brought into action.

The main feature of the present invention is in the shaping and mounting of the control gate proper. Preferably the gate is made of a single piece of light strong material, for example, plywood, and it is shaped so as to extend outwardly and downwardly from one end that is pivotally mounted to a vertical standard. When the gate is mounted this contour places the free end of the gate substantially lower than the supported end so as to adequately bar the passage of anyone attempting to pass beneath or around the gate, while the lower edge of the gate is cut away so as to curve inwardly and downwardly to meet the low end. The upper edge of the gate is shaped so as to curve outwardly and downwardly to meet the lower end so that it provides a gradually descending handrail for a passenger getting off the vehicle. Further, the particular shaping of the gate reduces the weight considerably and consequently the spring tension required to return the gate to its original position is greatly reduced and at the same time the cut out lower edge provides a clearance for the knees of a passenger that may be standing behind the gate when it is released.

A further feature of the present invention resides in the provision of an improved supporting standard for the gate and switch means between the gate and power operated doors. The usual flat topped base for the standard is replaced by a box having a sloping conical top making it practically impossible for anyone to stand on the base and also eliminates the sharp corners which might cause injury to a passenger. The supporting standard is provided with internal thrust bearings which reduce friction considerably making it possible to utilize a very light return spring and an improved switch construction greatly reduces the potential hazards of short circuits or other operational failures.

*Detailed description*

Having thus generally described the nature of the invention, particular reference will be made to the accompanying drawings, and in which:

Figure 1 is a front view of a safety control gate and vertical support constructed in accordance with the invention as it may be installed in a public vehicle.

Figure 2 is a plan view of the gate construction of Figure 1 with a portion of the vehicle diagrammatically illustrated to show the relative position of the gate and vehicle doors.

Figure 3 is a section of Figure 1 along the line 3—3 to illustrate the preferred shape of the safety gate edges.

Figure 4 is an enlarged front view partially in vertical section of the gate supporting standard and base.

Figure 5 is an enlarged plan view of a section of the construction of Figure 1 along the line 5—5.

Figure 6 is an enlarged detail view partially in vertical cross section of the lower portion of the gate support and housing.

Figure 7 is an enlarged sectional view corresponding to Figure 5 to illustrate the relative position of supporting column, gate stop and switch means when the gate is in the open position.

Figure 8 is an enlarged detail view in horizontal cross section of the adjustable contact member on the gate supporting column.

Figure 9 is an enlarged detail view of a section of the switch contact member.

Figure 10 is a diagrammatic view of the switch and a suitable circuit.

With particular reference to Figures 1 and 2 of the drawings, a safety control gate 10 constructed in accordance with the invention is shown mounted so as to bar an exit passage on a tram or bus. The entrance to the exit passage illustrated is confined between a vertical standard "A" and a vertical standard "B" from which a "modesty panel" "C" extends to the side of the vehicle adjacent a pair of folding doors "D" usually operated by compressed air. The gate 10 is mounted for horizontal swinging movement on a supporting and door actuating mechanism 12 so that it can perform a 90° arc about the supporting member 12 inside of the doors "D."

Preferably, the body of the gate 10 is made of a single piece of light strong material, for example, a sheet of plywood about one-half inch (½") thick and it is shaped so as to have a rounded marginal edge (see Figure 3), with one end 14 suitably drilled so that it can be secured to a bracket 16 by screws or bolts 18. The other end 20 of the gate 10 is shaped so as to descend considerably below the end 14 when the gate is mounted and the lower edge 22 is cut out so as to curve outwardly and downwardly towards the end 20.

This shaping of the lower edge 22 of the gate reduces the weight considerably and also provides additional clearance from the bottom edge of the gate to the floor of the vehicle so that when the gate swings back it will not strike against the knees of a following passenger. The upper edge 24 of the gate is also shaped so as to curve outwardly and downwardly to meet the lower end 20 providing a curved handrail that follows the usual step down arrangement of the exit passageway.

The gate supporting and door operating mechanism 12 is mounted on a circular base 30 adapted to be secured to the floor of a vehicle. The base 30 includes a centrally bored upstanding portion 31 adapted to receive and support a vertical shaft 32. The vertical shaft 32 is reduced at both ends 33, 34 to provide the shoulders 35, 36, the lower end 33 fitting within the portion 31 with a thrust bearing 37 mounted on the shaft end between the shoulders 35 and the upper surface of the base portion 31. A second thrust bearing 38 is mounted on the upper end 34 of the shaft 32 so as to rest against the shoulder 36 and a tubular member 39 is mounted over the outer races of the bearings 37, 38 so as to be maintained in rotatable spaced apart relationship with the shaft 32. A coil spring 40 is mounted over the shaft 32 and one end is engaged with the shaft 32 as indicated at 43 with the other end engaged with the tubular member 39 as indicated at 44. With this arrangement rotary movement of the tubular member 39 compresses the spring 40 about the shaft 32 and release of the member 39 allows the spring 40 to return the member 39 to its original position. A cap 50 is provided that fits over the upper end 34 of the shaft 32 and is retained in position on the shaft by a set screw 51.

The bracket 16 is permanently secured to and extends from the upper end of the tubular member 39 so as to support the gate 10 in a horizontal position. The travel of the tubular member 39 and consequently the amount of rotation of the gate 10 is controlled by a stop member 56 projecting outwardly from the base of the member 39 to which it is secured by means of taper pins 57 and bolts 58.

The movement of the stop member 56 is limited in one direction by engagement with a rubber bumper 60 that is secured to the base portion 31 so as to dampen the closing action of the gate, and in the other direction by a stop plate 62 that is also secured to and extends from the upstanding base portion 31. The stop plate 62 is drilled and tapped and a screw 64 is provided that extends beyond the plate 62 and contacts the stop member 56. By adjusting the amount that the screw 64 protrudes beyond the plate 62 the travel of the member 56 can be regulated so that the gate 10 will stop at the required position when opened.

The rotary movement of the tubular member 39 is adapted to control by means of a suitable electric circuit the power means for opening and closing the doors "D." This is accomplished by having a semi-circular metal strap 70 secured to the tubular member 39 by means of screws 72, with the slots 73 in the strap 70, through which the screws 72 pass, elongated so that the strap 70 can be adjusted axially of the member 39. A semi-circular portion of insulating material 76 such as Bakelite, hard rubber or the like is then secured to the strap 70, preferably with a strip of varnished cambric 74 between if the circuit employed is to be 32 volts or higher. The insulating member 76 is recessed and a curved metallic plate 78 is fastened in the recess so as to be flush with the outer surface of the insulating member 76.

A pair of resiliently mounted electric contacts, preferably round copper brushes 80 are mounted on an insulated contact plate 82 secured directly to the base portion 31 so that the rotation of the member 39 in one direction is adapted to bring the metallic insert 78 into contact with and bridge the contacts 80, and in the other direction to break such contact. The contact plate 82 also supports terminals 84, 86 to which the leads 87, 88 of a suitable circuit are attached, see Figure 9, and one of each of said terminals are connnected to one of the contact members 80. The leads 87, 88 are connected to a suitable source of electric energy, and the door operating circuit respectively, so that when the gate 10 is swung a sufficient amount the circuit between the contacts 80 is closed and the electric current is available to operate the door opening mechanism. A switch "E" is inserted in series with the source of electricity so that the gate controlling mechanism can be rendered inoperative if desired.

In order to shield the contact members and switch from possible damage a cylindrical steel cover 90 is provided that is secured to the base plate 30 by means of screws 92. A fibre lining 94 is provided within the cover that goes completely around the inside of the cover so as to adequately insulate the switch and contacts so that the cover can be rotated to any position without danger of shorting any of the electrical contacts. In order to completely close in the cover and also to prevent anyone from standing on the base a conical top 96 is provided with a downwardly extending flange 98 that fits over and is secured to the cover 90. The top 96 is provided with a central opening that fits snugly about the tubular member 39 and a cut out 99 is provided so that the top and cover can be raised above the spring retaining bolt 44 when it is necessary to inspect or repair the switch and contact members.

I claim:

In a vehicle having an exit passageway and power actuating doors barring said passageway, the combination with a control apparatus for operating said power actuating doors including, a safety control gate mounted for horizontal swinging movement in said passageway, a base adapted for attachment to the floor of said vehicle, a shaft extending vertically from said base, a tubular member surrounding said shaft and mounted for restricted rotary movement thereon, thrust bearings between said tubular member and shaft, a coil spring mounted on said shaft within said tubular member and connected between said shaft and member whereby rotary movement of said member in one direction compresses said spring and release of said member allows said spring to rotate said member in the opposite direction, a bracket extending from said tubular member adapted to support the end of said control gate, a housing surrounding said base in spaced apart relationship from said tubular member and including a cover member having a central opening adapted to fit closely about said tubular member and a lower edge adapted to fit outside of said housing, and electrical contact means mounted on said base and tubular member whereby movement of said tubular member in one direction is adapted to close said contact points and movement of said tubular member in the opposite direction is adapted to break said contact.

JAMES A. McKAY.

REFERENCES CITED

The following references are of record in the file of this patent:

UNITED STATES PATENTS

| Number | Name | Date |
|---|---|---|
| 1,678,122 | Martin | July 24, 1928 |
| 1,863,509 | Swanson et al. | June 14, 1932 |
| 1,911,293 | Scroggs | May 30, 1933 |
| 1,951,906 | Hansen | Mar. 20, 1934 |